Sept. 5, 1967       B. R. J. H. ALVDEN       3,339,954
MEANS FOR RELEASABLE CONNECTION OF BUILDING ELEMENTS
Filed March 28, 1966                         2 Sheets-Sheet 1

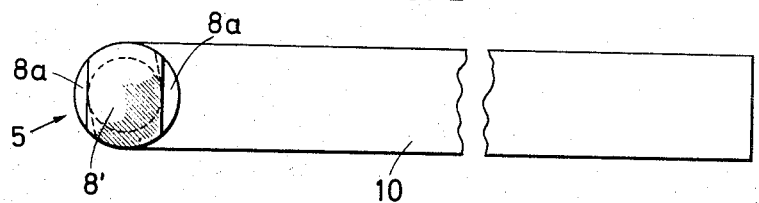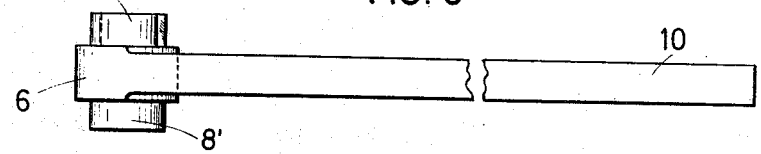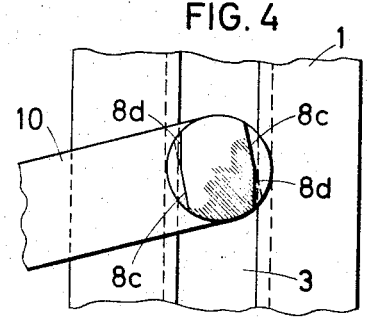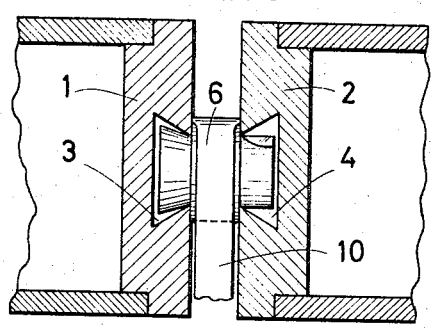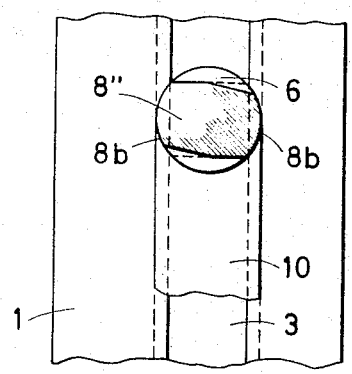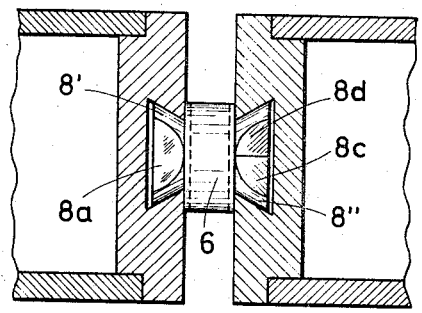

3,339,954
MEANS FOR RELEASABLE CONNECTION OF BUILDING ELEMENTS
Bror Robert John Hjalmar Alvdén, Goteborg V, Sweden, assignor to Aktiebolaget Gotaverken, Goteborg, Sweden, a corporation of Sweden
Filed Mar. 28, 1966, Ser. No. 538,093
Claims priority, application Sweden, Apr. 13, 1965, 4,802/65
1 Claim. (Cl. 287—189.36)

ABSTRACT OF THE DISCLOSURE

Building elements such as wall sections or window and door frame sections are secured together by connecting means engaging grooves in abutting edges of the sections. The connecting means and grooves are formed to permit a temporary engagement of the connection and the groove in one section until the next abutting section is brought into place.

---

Figure 1:
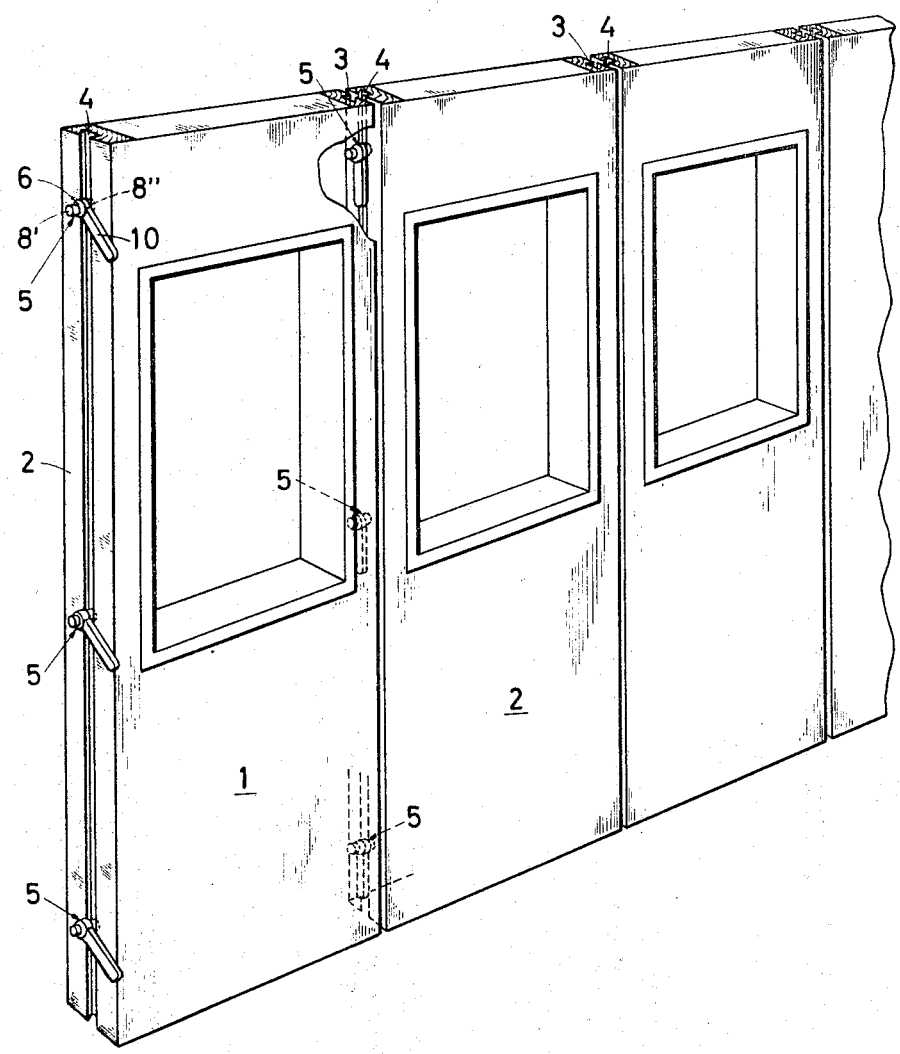

For releasable connection of building elements such as partition wall sections, window and door frames adapted to be mounted in walls and so forth connecting members of different design have been used. One type of connecting member consists of a central body provided with two oppositely extending dowels. Each dowel has two smooth sides and two toothed sides. The elements to be mounted have grooved edge portions and are arranged in close relationship, whereupon the connecting members are inserted at the end of the grooves with the smooth sides of the dowels parallel to the side walls of the grooves. The members are then slid to desired position in the joint between the elements, where they are turned 90°. The toothed sides of the dowels will then be pressed into the side wall of the grooves thereby locking the elements together.

The mounting and adjustment work required during the erection of big, heavy elements can be diminished if it is possible provisionally to attach the necessary number of connecting members at a first element before the next element is erected. This is according to the present invention obtained by arranging the smooth sides of one dowel only of the connecting member parallel to each other and at a distance which is slightly smaller than the narrowest part of the groove, whereas each of the corresponding sides of the other dowel is divided into two facets. Diametrically opposite facets of the two sides form pairs and the location of a first pair of such facets coincides with the smooth sides of the first dowel whereas the second pair of facets is arranged to deviate from the first pair at an acute angle.

In the drawings:
FIGURE 1 is a perspective view of a wall being erected.
FIGURE 2 shows a side view of a connecting member according to the invention.
FIGURE 3 is a view seen from above on the same detail.
FIGURE 4 shows the member in a provisional locking position.
FIGURE 5 shows the member in its definite locking position.
FIGURES 6 and 7, finally, show horizontal projections of FIGURES 4 and 5, respectively.

The wall elements 1 and 2, which may consist of a light metal frame supporting panels of various kinds and having suitable openings for windows are provided with grooves 3, 4 in their vertical edges. These grooves extend longitudinally from end to end of the groove and are adapted to cooperate with connecting members 5.

A connecting member 5 consists of a central body 6 provided with dowels $8^I$ and $8^{II}$ extending from opposite sides thereof and arranged symmetrically with respect to a common axis. Both dowels have two toothed surfaces $8b$ each, which here are wedge shaped and basically contains one tooth each. One of these dowels $8^I$ has two parallel side surfaces $8a$ arranged at a distance from each other, which is somewhat less than the narrowest part of the grooves, 3 or 4, respectively, arranged in the edge of the building element, 1 or 2, respectively.

The groove—3 or 4, respectively—is preferably dovetailed but may be given arbitrary suitable form. The locking sides $8b$ of the dowels $8^I$ and $8^{II}$ are shaped to fit the cross section of the grooves but have sufficient width to exert pressure thereon to lock the member in desired position. Each smooth side of the other dowel $8^{II}$ is divided into two facets, $8c$ and $8d$, respectively. A facet in one side is parallel to its diametrically located counterpart on the other side. They thus form pairs, $8c$, $8d$, of which one, $8c$ is arranged to coincide with the smooth sides, $8a$, of the first dowel $8^I$, whereas the other pair of facets, $8d$, deviate from the first pair of facets at an acute angle. This angle may be 5–20°, preferably 15°, depending on the material utilized in the connecting member and in the part of the building element, where the grooves are arranged.

The central body of the connecting member 5, the dowels $8^I$ and $8^{II}$ and a handle 10 fitted to the central body are all preferably manufactured as one element for instance of light metal, plastic resin or the like.

The erection of two elements 1, 2 is arranged in such a manner that when the connecting member has been brought to a suitable spot in a groove 3 or 4, respectively, the dowel $8^I$ is turned in such a manner that the side surface facets $8d$ of the other dowel $8^{II}$ will be parallel to the groove. Hereby diametrically opposite corner edges, upper and lower, respectively, between the smooth sides $8a$ and the locking surface $8b$ of the dowel $8^I$ are brought into contact with the side walls of the groove whereby a provisional locking of member 5 is obtained. When a sufficient number of members have been fitted in this manner the following element is brought in position and moved sidewards in such a manner that the projecting dowels $8^{II}$ will enter the groove therein. The central body 6 then acts as a distance piece and guarantees that the elements will always attain the proper mutual position. During a continued turning of the connecting member by means of the handle 10 in the same direction as before the locking surfaces $8b$ will be brought into active position, where they exert the highest pressure in such a manner that a good locking is obtained. In this position the handle is concealed in the space between the elements.

It will be noticed that the locking member can be utilized in the same manner as described in the main specification, i.e., be slid up and down the joint between two elements. Even if it may be advantageous during erection of heavy elements to provisionally mount the members at one element the basic procedure may be utilized and it is always possible to remove any arbitrary element from an erected series by releasing the pertaining members and removing them from the top or the bottom of the groove.

I claim:
In a building structural assembly comprising building elements having opposed matching continuous grooves with essentially parallel side walls in their edge portions, each groove extending longitudinally from end to end of the pertaining edge;
    a number of connection members for insertion in said grooves for engaging opposed grooves,
    each member consisting of a central operating body having opposite body faces, said operating body being positioned between the edges of the elements, said opposite body faces which abut the grooved edges being wider in all dimensions than the opening in said grooves;

axially aligned first and second dowels oppositely extending from said body faces, each dowel being somewhat shorter than the depth of the groove and having two smooth sides and two locking sides arranged essentially at an angle of 90° in relation to each other, said locking sides being spaced a greater distance than the smallest width of a groove;

the smooth sides of the first dowel being parallel to each other and spaced from each other by a distance slightly smaller than the narrowest part of the groove, each smooth side of the second dowel being divided into two facets, diametrically opposite facets of the two sides forming pairs, a first of said pairs of facets being coplanar with the smooth sides of the first dowel and a second pair of facets being arranged to deviate from the first mentioned pair of facets at an acute angle; and operating means reaching through the clearance between the elements to engage the operating body for turning the connection members so that the smooth sides of the members will allow removal from between the elements by sliding the members through said groove.

References Cited
UNITED STATES PATENTS

| | | | |
|---|---|---|---|
| 2,675,287 | 4/1954 | Sitler | 287—189.36 X |
| 3,123,887 | 3/1964 | Boettner | 287—20.92 X |
| 3,276,172 | 10/1966 | Alvden | 52—127 |

EDWARD C. ALLEN, *Primary Examiner.*